H. G. SLINGLUFF.
APPARATUS FOR HANDLING GLASS CYLINDERS.
APPLICATION FILED NOV. 27, 1908.
1,213,285.
Patented Jan. 23, 1917.
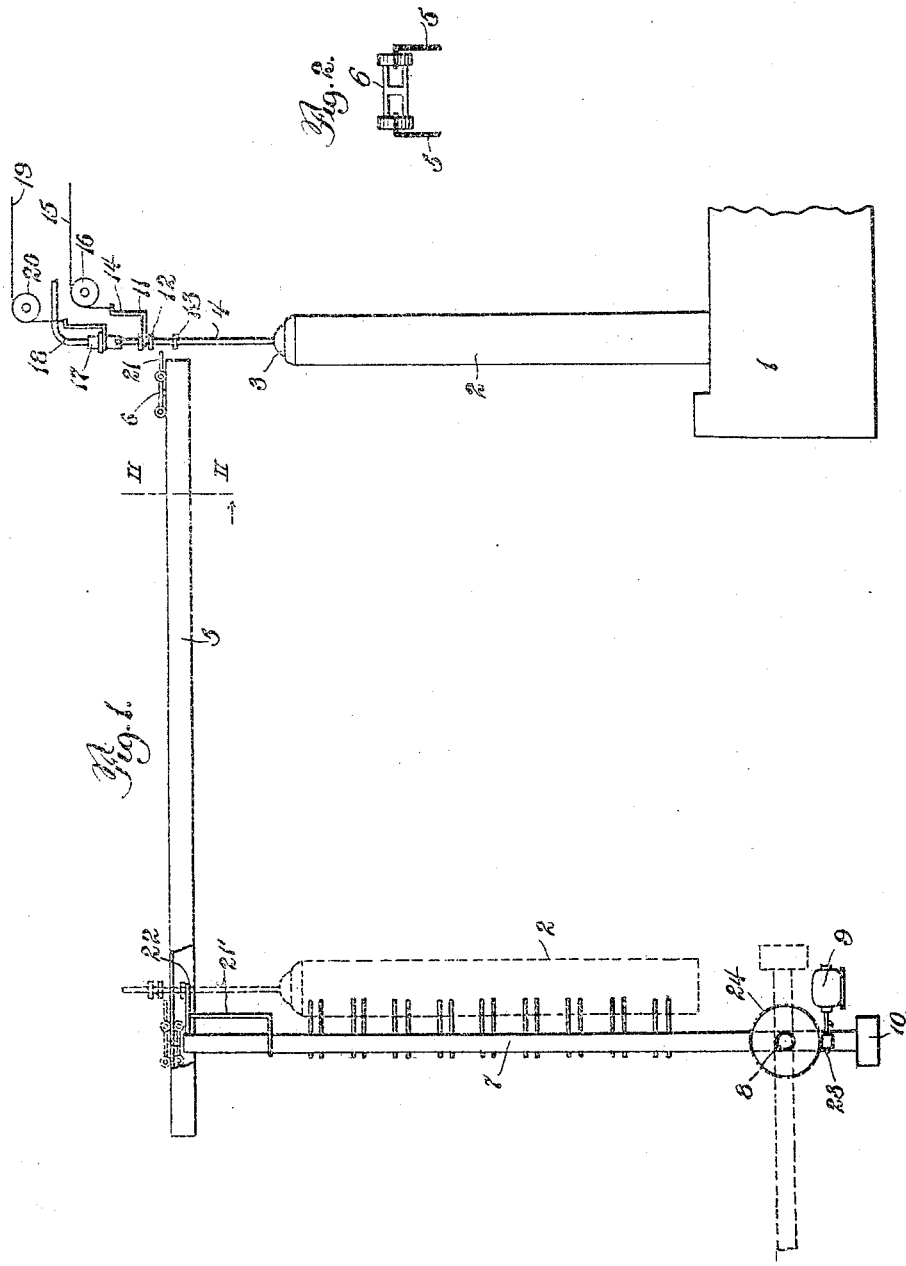
WITNESSES
INVENTOR
Harry G. Slingluff

UNITED STATES PATENT OFFICE.

HARRY G. SLINGLUFF, OF MOUNT VERNON, OHIO, ASSIGNOR TO PITTSBURGH PLATE GLASS COMPANY, OF PITTSBURGH, PENNSYLVANIA, A CORPORATION OF PENNSYLVANIA.

APPARATUS FOR HANDLING GLASS CYLINDERS.

1,213,285.  Specification of Letters Patent.  Patented Jan. 23, 1917.

Application filed November 27, 1908. Serial No. 464,768.

*To all whom it may concern:*

Be it known that I, HARRY G. SLINGLUFF, a citizen of the United States, residing at Mount Vernon, Ohio, have invented certain new and useful Improvements in Apparatus for Handling Glass Cylinders, of which the following is a specification.

The invention relates to mechanism for handling the glass cylinders formed for the manufacture of window glass; and has for its principal objects; the provision of an improved and simplified form of mechanism whereby the cylinders drawn may be easily lowered and placed in a horizontal position; and the provision of a mechanism whereby the cylinders may be carried laterally any desired distance from the point of drawing. One embodiment of the invention is illustrated in the accompanying drawings, wherein:—

Figure 1 is a diagrammatic side elevation of the apparatus and,

Figure 2 is a section through the track on the line II—II of Figure 1.

Referring to the drawings, 1 is the tank or receptacle containing molten glass from which the drawing occurs; 2 is a glass cylinder which has been drawn; 3 is the bait provided with the hollow handle 4 for the admission of air; 5—5 are angle irons comprising a laterally extending track; 6 is a trolley or carrier mounted upon the track; 7 is a support for moving the cylinder to horizontal position, which support is pivoted upon the shaft 8 and is operated by means of a motor 9; and 10 is a counterweight for the support.

The handle 4 of the bait is preferably provided with three collars 11, 12 and 13, and the bait is raised to the position shown and the glass cylinder drawn by means of the fork member 14 whose end engages the upper collar 11, such member 14 being operated by means of the cable 15 passing over the pulley 16. Air is supplied through the hollow handle 4 during drawing by means of the connection 17 provided with the usual flexible supply pipe 18. This connection 17 is raised and lowered by means of the cable 19 passing over the pulley 20. The trolley 6 preferably comprises a frame portion mounted upon wheels which lie above and below the flanges of the angles as indicated in Figure 2, and has at its front end a fork member 21 adapted to fit over the handle 4, and receive the collar 12 when the member 14 is lowered to disconnect the upper end of the handle 4 from its connection 17. After the bait is supported upon the fork 21 the member 14 is disengaged and the cylinder moved laterally to the position indicated in dotted lines at the left of Figure 1. The upper end of the support 7 is provided with a bracket 21' carrying at its upper end a forked portion 22, which forked portion is adapted to engage the handle 4 of the bait beneath the third collar 13 when the trolley or carrier 6 is moved to the position indicated in dotted lines at the left of Figure 1. When the trolley is moved still farther to the left and out of the way, the support 7 is tilted about its axis 8 to a horizontal position by means of the motor 9 whose shaft is provided with a worm 23 engaging a worm wheel 24 carried by the shaft 8. Pairs of arms are provided on the support 7 for partially encircling and supporting the cylinder.

Having thus described my invention and illustrated its use, what I claim as new and desire to secure by Letters Patent is the following:—

In apparatus for handling glass cylinders, a bait and drawing means upon which the bait is releasably supported, a track extending substantially horizontally to a point remote from the drawing means, a carrier mounted for movement along the track, means whereby the bait may be disengaged from the drawing means and supported on the carrier, a tilting takedown cradle at the end of the track, and means whereby the bait may be disengaged from the carrier and supported upon the cradle.

In testimony whereof I have hereunto signed my name in the presence of the two subscribed witnesses.

HARRY G. SLINGLUFF.

Witnesses:
J. M. MOTZ,
BANNER M. ALLEN.